(12) United States Patent
Ono et al.

(10) Patent No.: US 6,282,347 B1
(45) Date of Patent: Aug. 28, 2001

(54) OPTICAL FIBER CONNECTOR

(75) Inventors: Miki Ono; Ken Okochi; Shigeru Hatakeyama, all of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/484,628

(22) Filed: Jan. 18, 2000

(30) Foreign Application Priority Data

Jan. 18, 1999 (JP) .................................................. 11-009642

(51) Int. Cl.[7] ........................................................ G02B 6/32
(52) U.S. Cl. .................................. 385/74; 385/31; 385/33; 385/35; 385/93
(58) Field of Search .................................... 385/31, 33, 34, 385/35, 50, 43, 74, 88, 93; 359/642, 652, 648, 721

(56) References Cited

U.S. PATENT DOCUMENTS

| | | | |
|---|---|---|---|
| 5,026,206 | * | 6/1991 | Gache ...................................... 385/33 |
| 5,638,471 | * | 6/1997 | Semo et al. ............................. 385/33 |
| 5,699,464 | * | 12/1997 | Marcuse et al. ........................ 385/33 |
| 5,940,564 | * | 8/1999 | Jewell ..................................... 385/35 |

* cited by examiner

Primary Examiner—Hemang Sanghavi
(74) Attorney, Agent, or Firm—Brinks Hofer Gilson & Lione (57) ABSTRACT

The optical fiber connector of the invention comprises a first optical fiber, a first convex lens that converges light emitted from the first optical fiber, a second convex lens that converges light emitted from the first convex lens, and a second optical fiber that receives a convergent light beam from the second convex lens, wherein, when a core diameter of the first optical fiber is given by E1, a numerical aperture thereof by NA1, a core diameter of the second optical fiber by E2, a numerical aperture thereof by NA2, a focal length of the first convex lens by f1, a focal length of the second convex lens by f2, and (E1/E2)/(f1/f2)=x is introduced, a connection efficiency η of the first and the second optical fibers satisfies the following inequality $$(E1/E2)^2 < \eta \leq (1/x)^2 \cdot NA2/\sin(\tan^{-1} E1/E2 \cdot NA1/x),$$

in $$1 < x < E1/E2 \cdot NA1/\sin(\tan^{-1} NA2).$$

6 Claims, 7 Drawing Sheets

$E1s = E1 + 2 \times f1 \times \tan(\sin^{-1} NA1)$
$E1s > D1: \eta 1 = (D1/E1)^2$
$E1s \leq D1: \eta 1 = 1.0$ ——— 100%

FIG. 8

$E1s > D1: E1t = D1 \times f2/f1$
$E1s \leq D1: E1t = E1 \times f2/f1$
$E1t > D2: \eta 2 = (D2/E1t)^2$
$E1t \leq D2: \eta 2 = 1.0$ ——— 100%

FIG. 9

$E2s > E2: \eta 31 = (E2/E2s)^2$
$E2s \leq E1: \eta 31 = 1.0 \cdots 100\%$
$NAu > NA2: \eta 32 = NA2/NAu$
$NAu \leq NA2: \eta 32 = 1.0 \cdots 100\%$
$\eta 3 = \eta 31 \times \eta 32$

FIG. 10

$E1 : E2s = E1s : D2$
$\rightarrow E2s = E1 \times D2/E1s$

FIG. 11

$E1 : E2s = E1s : E1t$
$\rightarrow E2s = E1 \times E1t/E1s$

OPTICAL FIBER CONNECTOR

BACKGROUND OF THE INVENTION

1. Field of the Invention

The present invention relates to a connection structure of optical fibers, specifically to a connection device that connects optical fibers having different core diameters and made of different materials, such as a plastic fiber and a glass fiber.

2. Description of the Related Art

In connecting optical fibers, the most important technical task is to achieve a low transmission loss of light as far as possible.

As an example, in connecting two optical fibers having the core diameter of 60 μm and the specific refractive index difference of 0.7% with their end faces confronted with each other, it is generally conceived that an adequate transmission of light is difficult to be realized, unless, assuming that there is no crimp in the connecting area, the optical axis displacement is made within 0.2 μm and the connection loss is made within 0.2 dB.

Figure 17:
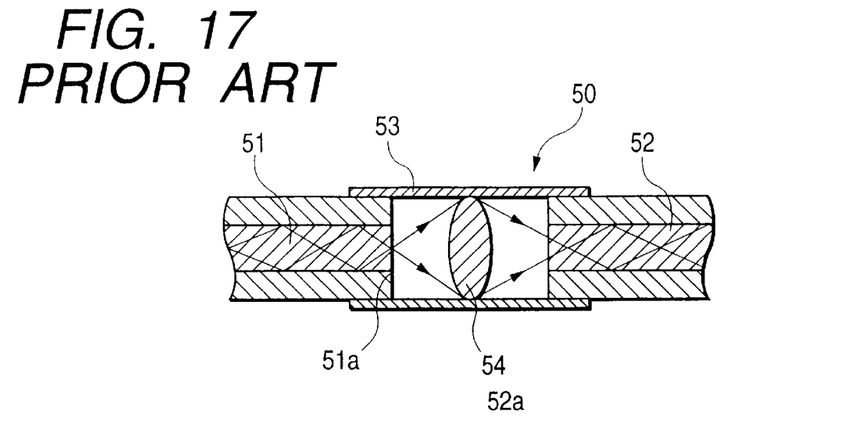
FIG. 17 is a sectional view to explain a first conventional optical fiber connector.

FIG. 17 illustrates a first conventional optical fiber connector 50 that has implemented such a low transmission loss. As illustrated, the first conventional optical fiber connector 50 includes a first optical fiber 51, a second optical fiber 52, a cylindrical connecting part 53 that connects the first and second optical fibers 51, 52, and a lens 54 contained in this connecting part 53, in which a light beam emitted from an end face 51a of the first optical fiber 51 falls on an end face of the second optical fiber 52 through the lens 54. Thus, the two optical fibers are optically connected.

Figure 18:
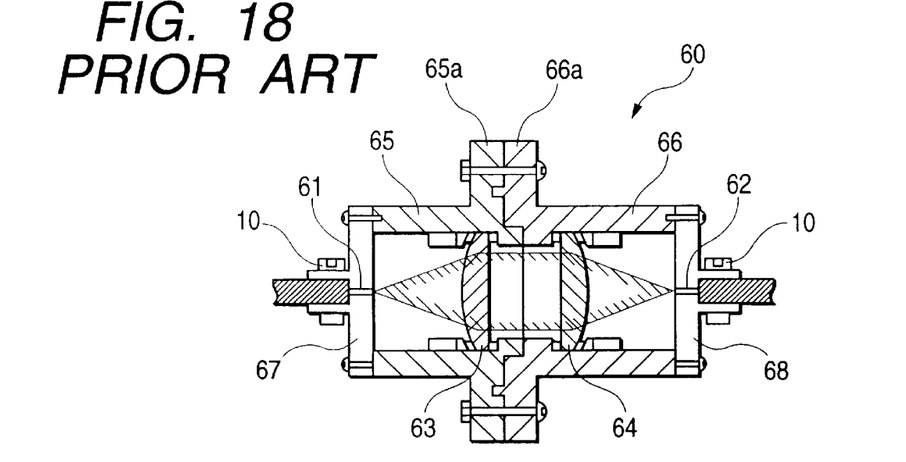
FIG. 18 is a sectional view to explain a second conventional optical fiber connector.

FIG. 18 illustrates a second conventional optical fiber connector 60, which includes a first cylindrical connecting part 65 with a flange 65a and a second cylindrical connecting part 66 with a flange 66a, and further a first lens 63 contained in the first connecting part 65 and a second lens 64 contained in the second connecting part 66.

First and second fixing parts 67, 68 having holes on the centers thereof, are mounted on the ends of the opposite sides to the flanges 65a, 66a of the first and second connecting parts 65, 66. Opposing ends of the first optical fiber 61 and the second optical fiber 62 are guided in the center holes of the fixing parts 67, 68.

The first and second lenses 63, 64 are fixed inside the first and second connecting parts 65, 66, respectively, so that the optical axes coincide with each other; and thereafter, the first and second connecting parts 65, 66 are attached so that the flanges 65a, 66a are engaged with each other. The first and second fixing parts 67, 68 are fastened to the first and second connecting parts 65, 66 with screws, etc. The first and second optical fibers 61, 62 are stripped of the sheathing parts from the front ends thereof, and the stripped ends each are engaged in the center holes of the fixing parts 67, 68.

Thus, the first and second optical fibers 61, 62 are configured so as to form the focuses on the end faces thereof, for example, a light beam emitted from the end face of the first optical fiber 61 is emitted as a parallel beam from the first lens 63, and the parallel beam falls on the second lens 64, which transforms the beam into a convergent beam. Thus, the two optical fibers are optically connected.

Figure 19:
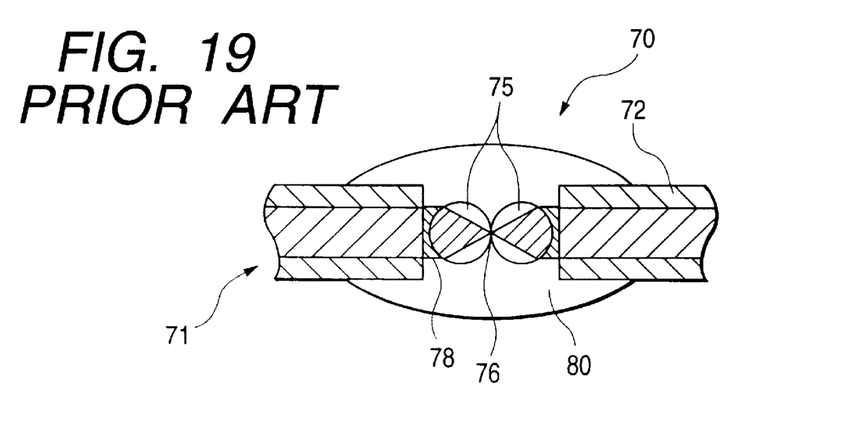
FIG. 19 is a sectional view to explain a third conventional optical fiber connector.

FIG. 19 illustrates a third conventional optical fiber connector 70, which includes a first optical fiber 71, a second optical fiber 72, two glass spheres 75 in contact with each other. The two glass spheres 75 are disposed between both front ends of the first and second optical fibers 71, 72. The connector 70 also includes, liquid substances 78 having a refractive index of approximately 1, which are inserted between the first optical fiber 71 and one glass sphere 75 and between the second optical fiber 72 and the other glass sphere 75, and a molded resin 80 that sheathes an area including both the front ends of the first and second optical fibers 71, 72, the liquid substances 78, and the two glass spheres 75 thus disposed.

A parallel beam emitted from the first optical fiber 71 falls on the one glass sphere 75 and converges at a point 76 where the two glass spheres come into contact. The convergent beam is transformed into a parallel beam through the other sphere 75, which falls on the second optical fiber 72. Thus, the two optical fibers are optically connected with a symmetrical optical path.

However, in such optical fiber connectors 50, 60, 70, a high positioning accuracy in the connection of the two optical fibers is required in order to transmit a stable light beam through the optical fibers connected. Further, it is necessary to enhance the efficiency of optical connection through the optical elements such as the lenses, so that a lower transmission loss of light than that obtained by the optical fibers being directly connected can be achieved.

Furthermore, in the connection of the two optical fibers having different diameters, for example, in the connection of a plastic optical fiber (POF) and a fused quartz fiber (PCF) having different core diameters, a higher positioning accuracy is required than the connection of optical fibers having the same diameter, and a low transmission loss of light has been difficult to be realized.

SUMMARY OF THE INVENTION

The present invention has been made in view of these problems, and it is an object of the invention to provide an optical fiber connector that enhances the efficiency of optical connection and thereby achieves a low transmission loss of light in the connection of optical fibers with different diameters.

As a first means to solve at least one of the foregoing problems, the optical fiber connector of the invention includes a first optical fiber, a first lens that converges light emitted from the first optical fiber, a second lens that converges light emitted from the first lens, and a second optical fiber that receives convergent light from the second lens. In the optical fiber connector thus configured, provided that the core diameter of the first optical fiber is given by E1, the numerical aperture thereof by NA1, the core diameter of the second optical fiber by E2, the numerical aperture thereof by NA2, the focal length of the first lens by f1, the focal length of the second lens by f2, and (E1/E2)/(f1/f2)=x is introduced, the connection efficiency η of the first and the second optical fibers satisfies the following inequality:

$$(E1/E2)^2 < \eta \leq NA2/\sin(\tan^{-1} E1/E2 \cdot NA1/x),$$

in $$0 < x \leq 1;$$

$$(E1/E2)^2 < \eta \leq (1/x)^2 \cdot NA2/\sin(\tan^{-1} E1/E2 \cdot NA1/x),$$

in $$1 < x < E1/E2 \cdot NA1/\sin(\tan^{-1} NA2)$$

or $$(E1/E2)^2 \cdot \eta \leq (1/x)^2,$$

in $$E1/E2 \cdot NA1/\sin(\tan^{-1} NA2) \leq x.$$

As a second means, provided that the effective aperture of the first lens is given by D1 and the effective aperture of the second lens is given by D2, the connection efficiency η1 by only the influence of the D1 is expressed by the equation:

$$\eta 1 = D1/(E1 + 2 \times f1 \times \tan(\sin^{-1} NA1))^2,$$

and the connection efficiency η2 by only the influence of the D2 is expressed by the equation:

$$\eta 2 = (D1/(D1 \times f2/f1))^2,$$

the optical fiber connector has a connection efficiency that is the foregoing η multiplied by η1 and/or η2.

Further, as a third means, the optical fiber connector is comprised of the first lens made by forming the end face of the first optical fiber into a spherical face, and the second lens made by forming the end face of the second optical fiber into a spherical face.

Further, as a fourth means, the optical fiber connector is comprised of either one of the first and the second lenses made by forming the end face of the first or the second optical fiber into a spherical face.

DESCRIPTION OF THE PREFERRED EMBODIMENTS

Figure 1:
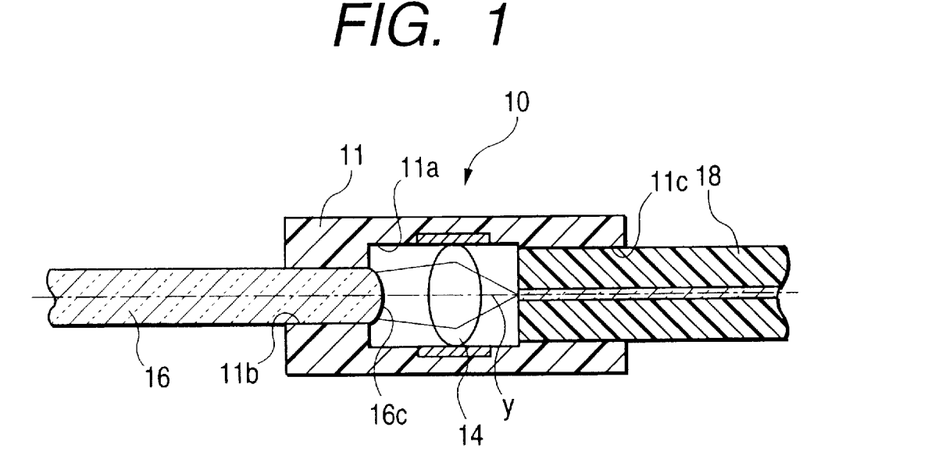
FIG. 1 is a typical sectional view of an optical fiber connector of the invention.

An optical fiber connector 10 as the first embodiment of this invention is provided with, as shown in FIG. 1, a cylindrical enclosure 11 made of a synthetic resin or a metal that does not transmit a light, a cylindrical optical guide path 11a provided inside the enclosure 11, a first round hole 11b and a second round hole 11c provided on both ends of the enclosure 11, each communicated with the optical guide path 11a.

A first biconvex lens (not shown) and a second biconvex lens 14 are engaged inside the optical guide path 11a, and are fixed so that the optical axes y coincide on both the incident and outgoing sides of the biconvex lenses 14.

Figure 2:
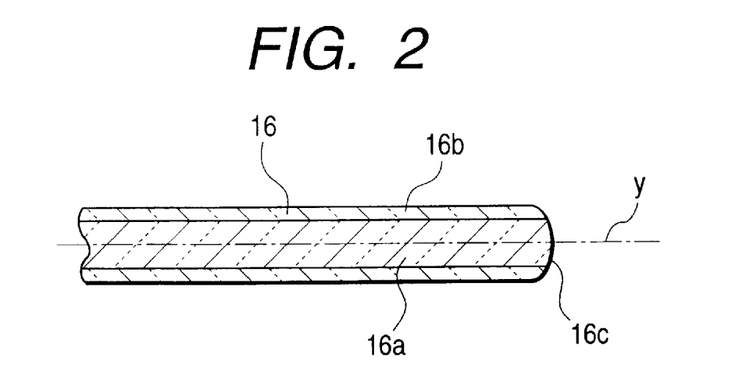
FIG. 2 is a sectional view of a plastic fiber of the connector.

A plastic fiber 16 comprises, as shown in FIG. 2, a core 16a made of a high purity polymethyl methacrylate (PMMA) and a clad 16b that sheathes this core 16a, made of a thin layer of special fluororesin. The diameter of the core 16a of this plastic fiber 16 is about 1 mm, which is thicker than that of a fused silica fiber 18 described later, and the front end of the plastic fiber 16 is polished to form an accurate spherical face, a convex part 16c.

The plastic fiber 16 contains the core 16a whose refractive index n1 is uniform in the radial direction, and allows long distance propagation of light while absorptions and scatterings attenuate the light gradually, which is the so-called multi-mode type (MMF).

One end of the plastic fiber 16 is made to be detachably fit in the first round hole 11b of the enclosure 11.

Figure 3:
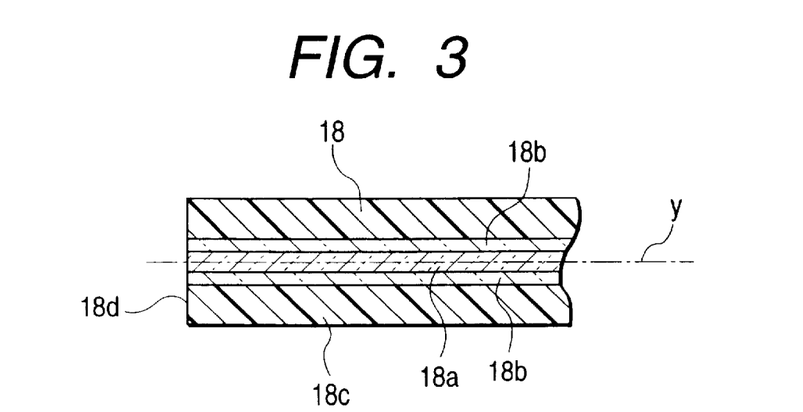
FIG. 3 is a sectional view of a fused quartz fiber of the connector.

The fused silica fiber 18 comprises, as shown in FIG. 3, a core 18a made of a quartz, whose diameter is about 0.05~0.2 mm, a cladding 18b made of the same quartz that sheathes this core 18a, and a fiber coating 18c made of a nylon resin that sheathes the cladding 18b. One end face 18d of the fiber 18 has a mirror finish applied.

The fused silica fiber 18 contains the core 18a whose refractive index n2 is uniform in the radial direction, and allows long distance propagation of light while absorptions and scatterings attenuate the light gradually, which is the so-called multi-mode type, the same as the plastic fiber 16.

One end of the fused silica fiber 18 is made to be detachably fit in the second round hole 11c of the enclosure 11. The inner diameters of the first and second 11b, 11c are made different in size to the fibers 16, 18 that have different outer diameters.

In this optical fiber connector 10, as shown in FIG. 1, a light beam fallen on one end face of the core 16a of the plastic fiber 16 propagates through the core 16a, and reaches the convex part 16c being the other end face. An outgoing beam from the convex part 16c diverges toward the second lens 14 in the optical guide path 11a, and after passing through the second lens 14, converges on the one end face 18d of the core 18a of the fused silica fiber 18. The light beam converged on the one end face 18d propagates through the core 18a and emits from the other end face of the core 18a.

In reverse to this, a light beam fallen on the other end face of the core 18a of the fused silica fiber 18 propagates through the core 18a, the one end face 18d, and the second convex lens 14, reaches the convex part 16c of the plastic fiber 16, propagates through the core 16a, and emits from the one end face.

In this manner, bidirectional communication of information is made between a transmitting end and a receiving end which are remotely located, and the receiving end converts a light signal into an electrical signal, thus receiving the information.

Next, in the optical fiber connector 10, the optimization condition for connecting optical fibers having different core diameters will be discussed with the following models.

Figure 4:
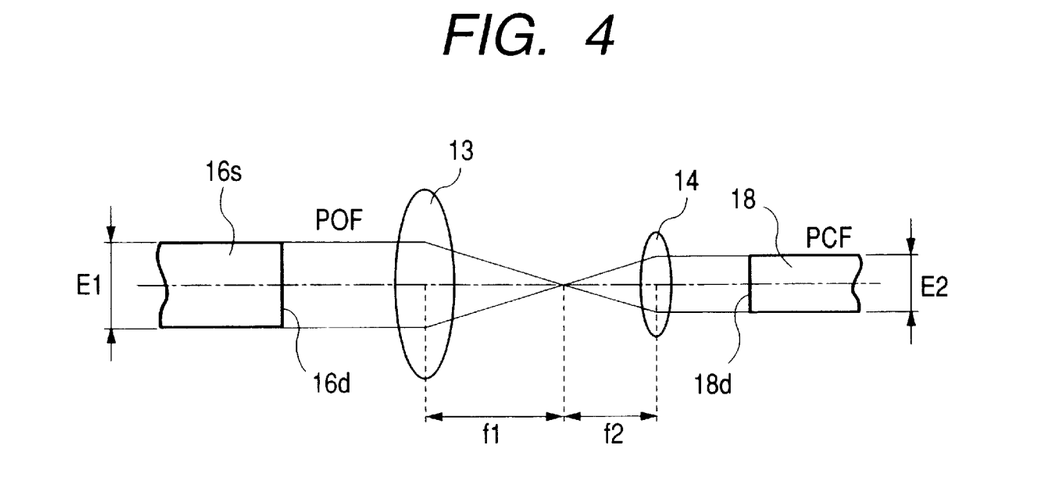
FIG. 4 is a typical drawing to explain the expander optical system of the optical fiber connector of the invention.

In the model A, the plastic fiber 16 is handled as follows. As shown in FIG. 4, the plastic fiber 16 is equivalently divided into a first optical fiber, namely, a plastic fiber (hereunder, POF) 16S having a core diameter D1 and an end face 16d of a vertical section with the convex part 16c cut off, and a first lens, namely, a first convex lens 13 having a spherical shape and the same focal length as the convex part 16c. The second optical fiber, namely, the fused silica fiber (hereunder, PCF) 18 and the second lens, namely, the second convex lens 14 are exactly the same as shown in FIG. 1.

When light propagating through the POF 16S is ideal, the light emitted from the end face 16d is a parallel light beam, which falls on the first convex lens 13. Then, the first convex lens 13 converges the light at the focus (focal length f1), and the convergent light is expanded into a parallel light of the same size as a core diameter E2 of the ECF 18 by the second convex lens 14 having a different focal length (focal length f2), and the parallel light advances toward the end face 18d of the PCF 18.

Thus, to diminish the diameter of a parallel light beam or to expand it in reverse, the so-called beam expander theory is employed.

The beam expander optical system in this case can be expressed by the following expression.

$$E1/E2 = \gamma = f1/f2 \quad (1)$$

Here, E1 represents the core diameter of the POF 16S, which is the same size as the diameter (beam size) of the bundle of rays of the parallel light beam, E2 represents the core diameter of the PCF 18, which is the same size as the diameter (beam size) of the bundle of rays of the parallel light beam, f1 represents the focal length of the first convex lens 13, and f2 represents the focal length of the second convex lens 14.

E1 can be regarded as the outer diameter of the core 16a of the plastic fiber 16S, and E2 can be regarded as the outer diameter of the core 18a of the fused silica fiber 18. Therefore, assuming that the core diameter of the POF 16S is 1 mm and the core diameter of the PCF 18 is 0.2 mm, for example, the optical system will be the beam expander of the reduction ratio 1/5 (=γ).

As mentioned above, the beam expander optical system premises the parallel light beam in the treatment.

However, in multi-mode propagation through the POF 16S, PCF 18, generally, the propagation speed of light becomes high when the light comes, in with a shallow angle from multiple point light sources, and it becomes low when the light comes in with a deep angle. Accordingly, when light (light pulse of a specially thin beam) is brought into incidence on the one end of the core 16a of the POF 16S, as shown in FIG. 5, the light reaching the other end face 16d of the core 16a of the POF 16 becomes not a parallel light beam but a divergent light.

Therefore, considering this divergent light, the optical fiber connector 10 recipes to add, as the factors for the optimization condition, the numerical apertures NA1, NA2 by the divergent luminous fluxes of the POF 16S, PCF 18, and the effective apertures D1, D2 of the first and second convex lenses 13, 14 to the beam sizes E1, E2 and focal lengths f1, f2 being the factors for the expander optical system.

Figure 5:
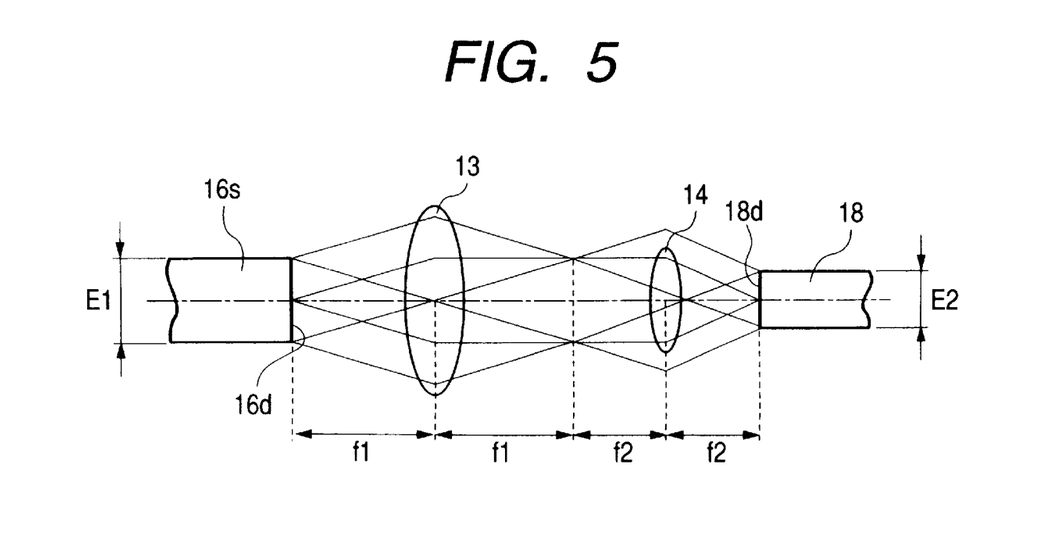
FIG. 5 is a typical drawing to explain the optical system of the optical fiber connector of the invention.
Figure 6:
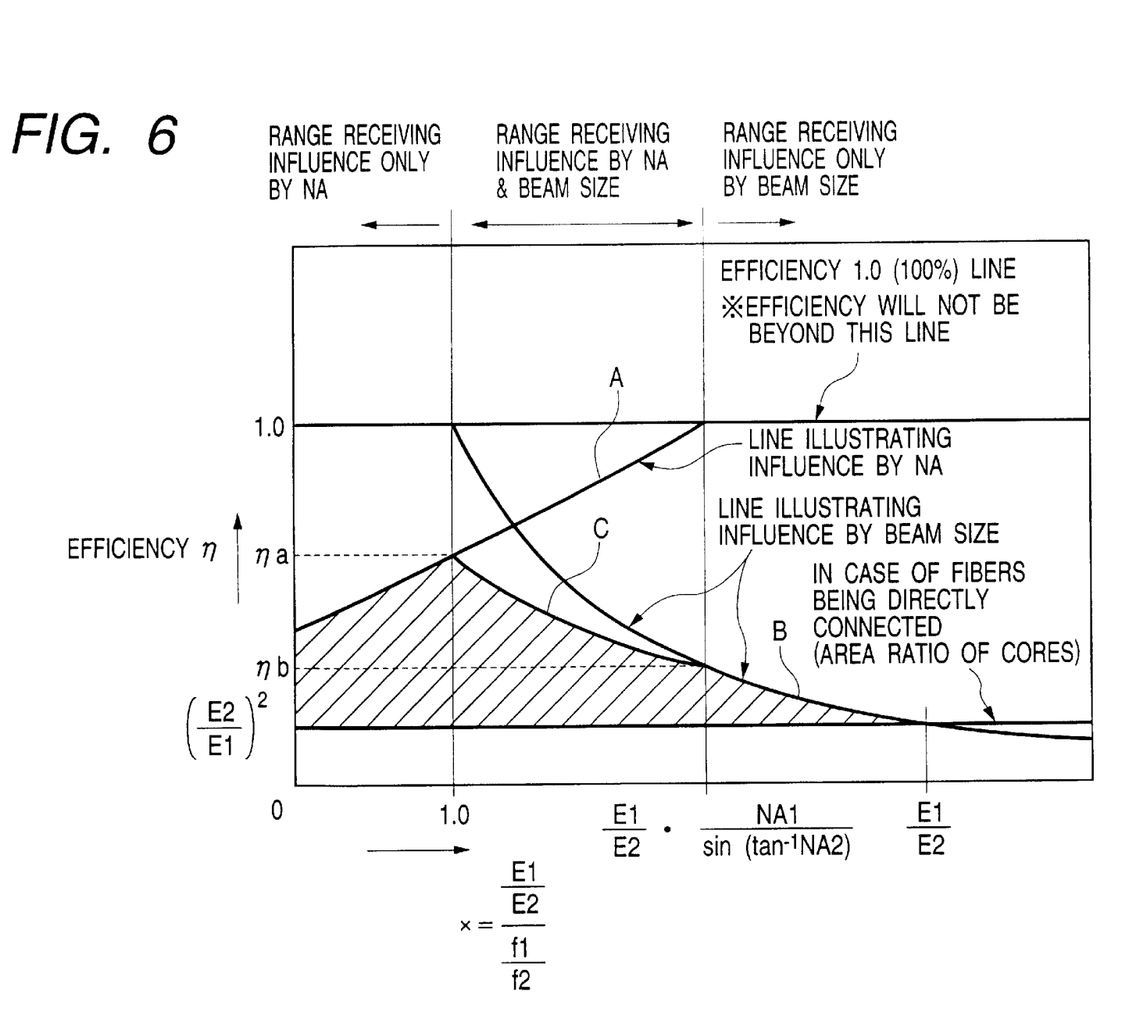
FIG. 6 is a graph to explain the connection efficiency of the optical fiber connector of the invention.

FIG. 6 illustrates a graph, in which the horizontal axis plots the values based on the four factors (E1, E2, f1, f2) that characterize FIG. 5, and the vertical axis plots the connection efficiency η of the optical fibers connected through the two lenses. As described later, the graph shows the influence to the connection efficiency η by the numerical aperture NA (NA1, NA2) and the two factors of the beam sizes.

In FIG. 6, the horizontal axis of the graph plots x, wherein, when the core diameter of the POF 16S is given by E1, the core diameter of the PCF 18 by E2, the focal length of the first convex lens 13 by f1, and the focal length of the second convex lens 14 by f2, x is given by the following expression.

$$(E1/E2)/(f1/f2) = x \quad (2)$$

Although the effective apertures (D1, D2) of the lenses are other factors, regarding these sizes as ∞, the influence of these effective apertures D1, D2 is assumed to be ignorable.

In FIG. 6, the curve A shows the influence of the numerical aperture NA, namely, the lowering of the connection efficiency η resulting from a loss from the numerical aperture NA.

Further, the curve B shows the influence of the beam size, the lowering of the connection efficiency resulting from a loss from the beam size.

Considering that the connection efficiency does not exceed 100%, the connection efficiency retains the following three ranges.

That is, the connection efficiency is divided into a range influenced only by the numerical aperture NA, a range influenced by the numerical aperture NA and the beam size, and a range influenced only by the beam size.

Further, the connection efficiency is required to be better than that when the POF 16S and PCF 18 are connected directly on the end faces with each other, and the following expression is deduced from the area ratio of each cores.

$$\eta > (E1/E2)^2 \quad (3)$$

Therefore, in the optical connector, the connection efficiency is required to be higher than that when the two optical fibers are directly connected, and preferably the connection efficiency η of the POF 16S and PCF 18 exceeds 0.5 (50%)~0.6 (60%) in the consideration of the transmission losses by the optical fibers themselves.

Next, based on FIG. 6, the influences of each factors will be discussed in the foregoing three ranges.

First, the curve A is given by the following expression.

$$\eta = NA2/\sin(\tan^{-1} E1/E2 \cdot NA1/x0) \quad (4)$$

Further, the curve B is given by the following expression.

$$\eta = (1/x)^2 \quad (5)$$

In the drawing, under the influence only of the numerical aperture NA ($0<x\leq 1$), the connection efficiency $\eta$ is better than that of the direct connection of the optical fibers, within the range enclosed by the expression (4) and the expression (3).

Further, under the influence only of the beam size $E1/E2 \cdot NA1/\sin(\tan^{-1} NA2) \leq x$, the connection efficiency is specified within the range enclosed by the expression (5) and the expression (3).

Under the influence of both the numerical aperture NA and the beam size $$1 < x < E1/E2 \cdot NA1/\sin(\tan^{-1} NA2),$$

the curve C showing both the influences is obtained by multiplying the expression (4) and the expression (5), which is given by the following expression.

$$\eta = (1/x)^2 \cdot NA2/\sin(\tan^{-1} E1/E2 \cdot NA1/x) \quad (6)$$

Thus, the connection efficiency is specified within the range enclosed by the expression (6) and the expression (3).

From FIG. 6, under the influence only of the numerical aperture NA, or under the influence of the numerical aperture NA and the beam size, when the ratio of the core diameter E1 of the POF 16S against the core diameter E2 of the PCF 18 is equal to the ratio of the focal length f1 of the first convex lens 13 against the focal length f2 of the second convex lens 14, namely, x becomes equal to 1, the connection efficiency of the optical fiber connector 10 becomes a maximum ($\eta a$).

Under the influence only of the beam size, the connection efficiency of the optical fiber connector 10 becomes a maximum ($\eta b$), in $x = E1/E2 \cdot NA1/(\sin(\tan^{-1} NA2))$.

From the comparison of the connection efficiency $\eta a$ and $\eta b$, the beam size rather than the numerical aperature NA is found to he the stronger factor to reduce the connection efficiency.

Therefore, in the optical fiber connector 10, the setting of the ratio of the focal length f1 against f2 to be equal to the ratio of the core diameter E1 against E2 (x=1), aiming at the maximization ($\eta a$) of the connection efficiency, will reduce the influence to the connection efficiency of the numerical aperture NA and the beam size.

Next, the optical fiber connector 10 will be discussed from the view point of the light beam passing through the optical components, with reference to FIG. 7 through FIG. 15. Here, the effective apertures D1, D2 of the first and second convex lenses 13, 14 will be taken in as the factors for the optimization condition.

Figure 7:
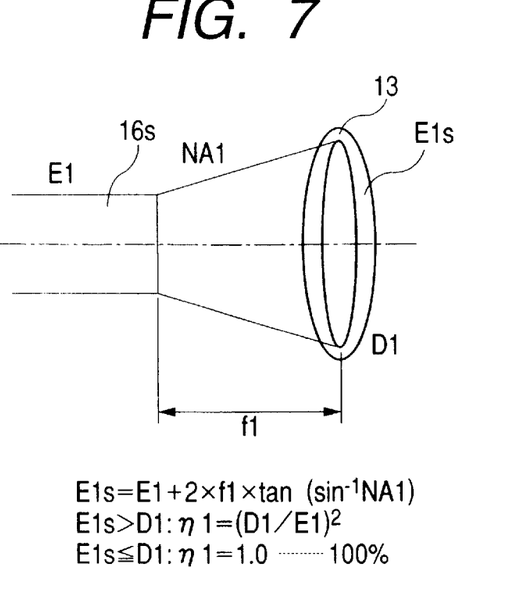
FIG. 7 is a drawing to explain a state in which the first lens receives a light beam emitted from the first optical fiber of the optical fiber connector of the invention.

1) at receiving an outgoing light from the POF 16S by the first convex lens 13

As shown in FIG. 7, the core diameter E1 and numerical aperture NA1 of the POF 16S specifies a beam size E1s at the focal length f1. Using this beam size E1s, a take-in efficiency $\eta 1$ by the effective aperture D1 of the first convex lens 13 is expressed as follows.

$$E1s = E1 + 2 \times f \times \tan(\sin^{-1} NA1) \quad (7)$$

$$\eta 1 = (D1/E1s)^2 \quad (8)$$

Here, if the effective aperture D1 of the first convex lens 13 is sufficiently large, the whole light beam is transmitted through the lens, and the take-in efficiency $\eta 1$ becomes 1.00 (100%).

FIG. 7 illustrates a case of the effective aperture D1 of the first convex lens 13 being sufficiently large, as an example.

Figure 8:
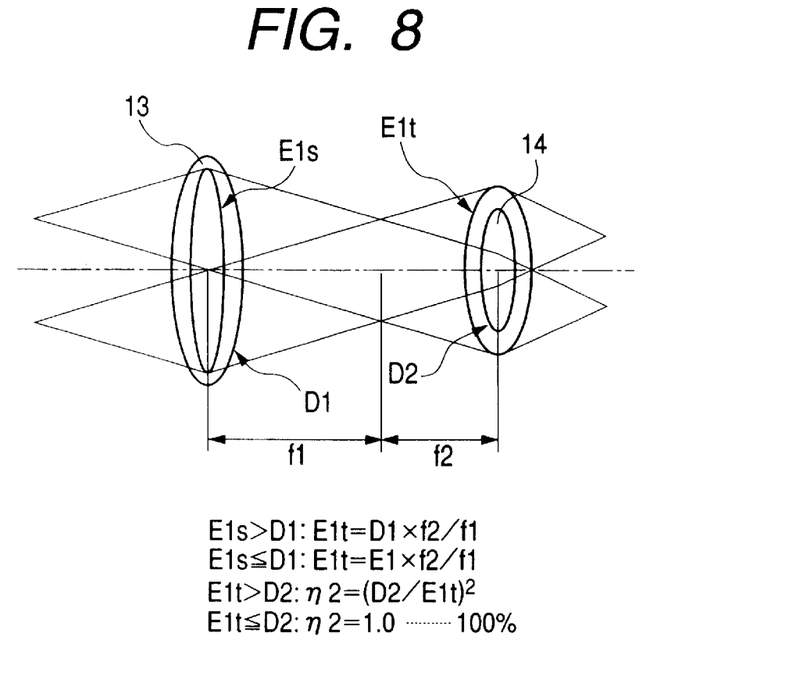
FIG. 8 is a drawing to explain a state in which the second lens receives a light beam transmitted through the first lens of the optical fiber connector of the invention.

2) at receiving a light transmitted through the first convex lens 13 by the second convex lens 14

As shown in FIG. 8, the beam size (E1s or D1) at transmitting through the first lens 13 and a beam size E1t at reaching the second lens 14 are specified by the ratio of the focal length f1 against f2 of the first and second convex lenses 13, 14. Using this E1t, a take-in efficiency $\eta 2$ by the effective aperture D2 of the second convex lens 14 is expressed as follows.

$$E1t = D1 \times f2/f1 \quad (\text{here}, E1s > D1) \quad (9)$$

$$E1t = E1s \times f2/f1 \quad (\text{here}, E1s \leq D1) \quad (10)$$

$$\eta 2 = (D2/E1t)^2 \quad (11)$$

Here, provided that the effective aperture D2 of the second convex lens 14 is sufficiently large, the light beam of the beam size E1t transmitted entirely through the lens, and the take-in efficiency $\eta 2$ becomes 1.0 (100%).

FIG. 8 illustrates a case that the light beam sufficiently taken in by the first convex lens 13 overflows from the effective aperture D2 of the second convex lens 14.

Figure 9:
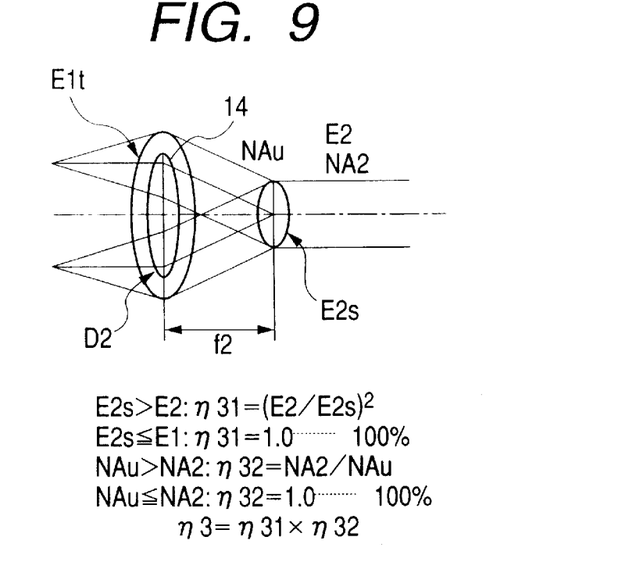
FIG. 9 is a drawing to explain a state in which the second optical fiber receives a light beam transmitted through the second lens of the optical fiber connector of the invention.

3) at receiving a light transmitted through the second convex lens 14 by the PCF 18

As shown in FIG. 9, a take-in efficiency $\eta 3$ of the PCF 18 is specified by the numerical aperture (NAu) of the convergent light and the numerical aperture (NA2) of the PCF 18 in addition to the beam size E1t.

Assuming that a take-in efficiency by the beam size E1t is $\eta 31$, and a take-in efficiency by the numerical aperture (NAu) of the convergent light and the numerical aperture (NA2) of the PCF 18 is $\eta 32$, the take-in efficiency $\eta 3$, namely, the connection efficiency $\eta$ is the multiplication of the two take-in efficiencies $\eta 31$, $\eta 32$, which is given by the following expressions.

$$\eta 31 = (E2/E2s)^2 \quad (\text{here}, E2s > E2) \quad (12)$$

$$\eta 31 = 1.0 \quad (\text{here}, E2s \leq E2) \quad (13)$$

Here, E2s represents the beam size on the PCF 18. Provided that the core diameter E2 of the PCF 18 is larger than E2s, the light beam of the beam size entirely falls on the PCF 18, and the take-in efficiency $\eta 31$ becomes 1.0 (100%).

And, the take-in efficiency $\eta 32$ is given by the following expressions.

$$\eta 32 = NA2/NAu \quad (\text{here}, NAu > NA2) \quad (14)$$

$$\eta 32 = 1.0 \quad (\text{here}, NAu \leq NA2) \quad (15)$$

Therefore, the take-in efficiency $\eta 3$ is expressed as follows.

$$\eta 3 = \eta 31 \times \eta 32 \quad (16)$$

Thus, the take-in efficiency $\eta 3$ is the total connection efficiency $\eta$ of the optical fiber connector 10, and as shown by the expression (6) and FIG. 6, and is the connection efficiency $\eta$ in the range where it is influenced by both of the numerical aperture NA and the beam size.

Next, the take-in efficiency $\eta 31$ will be explained with reference to FIG. 10 and FIG. 11.

Figure 10:
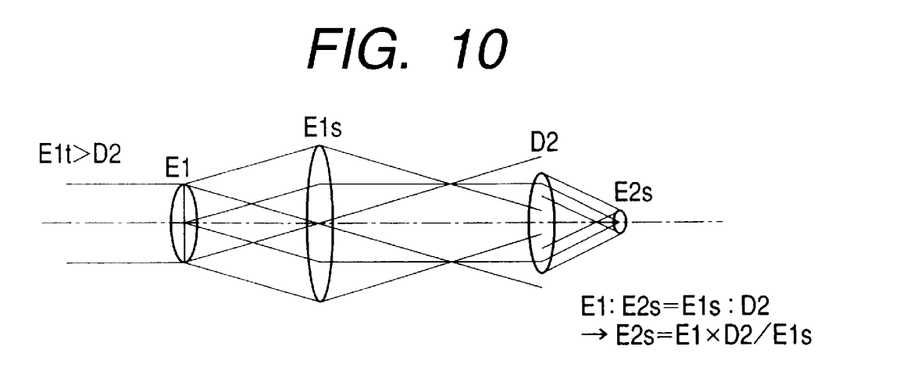
FIG. 10 is a drawing to explain the beam size in the lenses of the optical fiber connector of the invention.

FIG. 10 illustrates an optical system in which the beam size E1t falling on the second convex lens 14 is larger than the effective aperture D2 of the second convex lens 14. And, the beam size E2s on the PCF 18 is acquired from the proportional relation between the bean size E1s at the first convex lens 13 and the effective aperture D2 of the second convex lens 14, which is expressed as follows.

$$E1:E2s=E1s:D2 \tag{17}$$

Reducing (17), $$E2s=E1 \times D2/E1s \tag{18}$$

Figure 11:
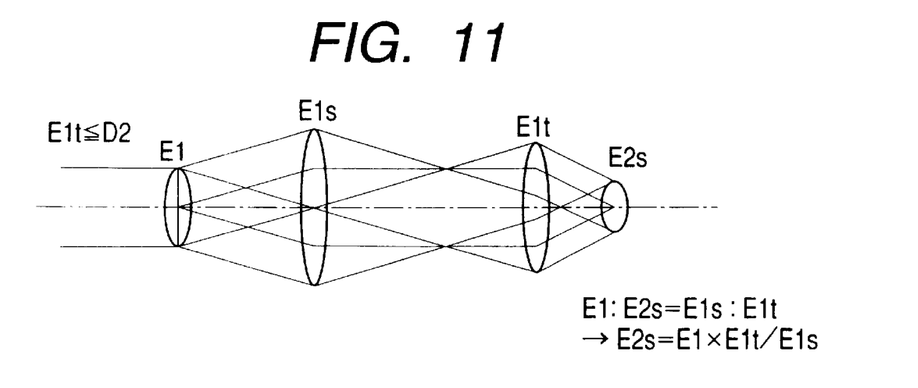
FIG. 11 is a drawing to explain the beam size in the lenses of the optical fiber connector of the invention.

FIG. 11 illustrates an optical system in which the beam size E1t falling on the second convex lens 14 does not exceed the effective aperture D2 of the second convex lens 14, which is opposite to the case in FIG. 10. The beam size E2s on the PCF 18 is acquired from the proportional relation between the beam size at the first convex lens 13 and the beam size E1t at the second convex lens 14, which is expressed as follows.

$$E1:E2s=E1s:E1t \tag{19}$$

Reducing (19), $$E2s=E1 \times E1t/E1s \tag{20}$$

Next, the take-in efficiency η32 will be explained with reference to FIG. 12 through FIG. 15.

As shown in FIG. 12 through FIG. 15, provided that W represents the beam waist where the beam becomes the thinnest at a midpoint between the two lenses, the first convex lens 13 and the second convex lens 14 in this case, W is given by the following expression.

$$W=2 \times f1 \times NA1 \tag{21}$$

Figure 12:
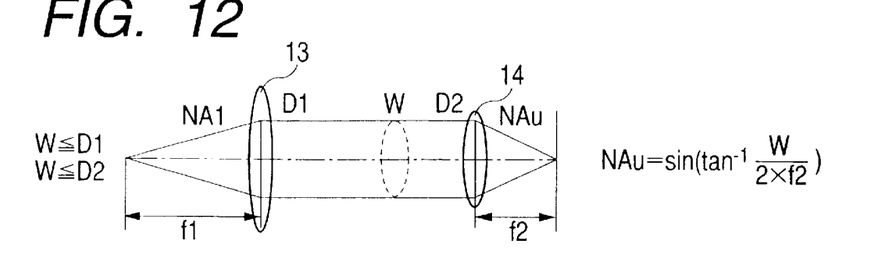
FIG. 12 is a drawing to explain the relation between the beam waist and the numerical aperture of the optical fiber connector of the invention.

As shown in FIG. 12, in case that the effective apertures D1, D2 of the first and second convex lenses 13, 14 each are sufficiently large, the numerical aperture NAu of the foregoing convergent light is expressed as follows.

$$NAu=\sin(\tan^{-1} W/2 \cdot f2) \tag{22}$$

Figure 13:
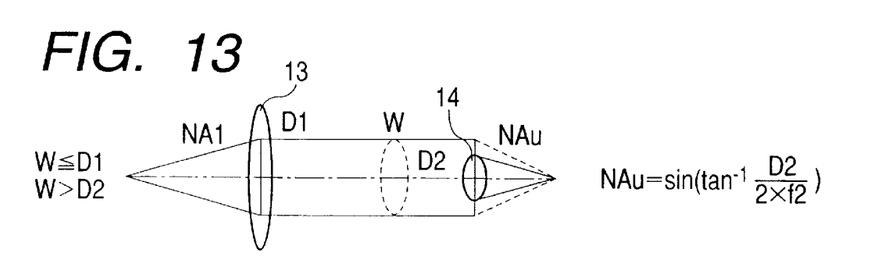
FIG. 13 is a drawing to explain the relation between the beam waist and the numerical aperture oil the optical fiber connector of the invention.

Next, in FIG. 13, in case that the effective apertures D2 of the second convex lenses 14 is smaller than a specific size, the numerical aperture NAu of the convergent light is expressed as follows.

$$NAu=\sin(\tan^{-1}(D2/2) \cdot f2) \tag{23}$$

Figure 14:
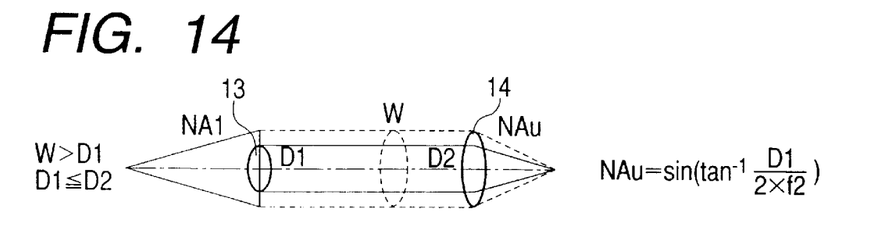
FIG. 14 is a drawing to explain the relation between the beam waist and the numerical aperture of the optical fiber connector of the invention.

Next, in FIG. 14, in case that the affective apertures D1 of the first convex lenses 13 is smaller than the specific size, the numerical aperture NAu of the convergent light is expressed as follows.

$$NAu=\sin(\tan^{-1}(D1/2) \cdot f2) \tag{24}$$

Figure 15:
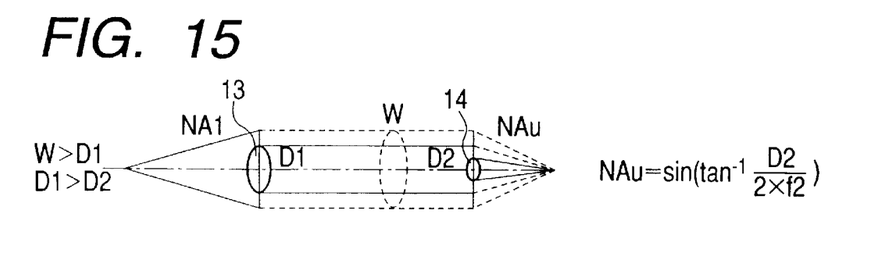
FIG. 15 is a drawing to explain the relation between the beam waist and the numerical aperture of the optical fiber connector of the invention.

Next, in FIG. 15, in case that the effective apertures D1, D2 of the first and second convex lenses 13, 14 both are smaller than the specific size, the numerical aperture NAu of the convergent light is given by the same expression as (22).

Thus, as shown in FIG. 12, when the effective apertures D1, D2 of the first and second convex lenses 13, 14 both are sufficiently large, the take-in efficiency η31 of the beam size E1t is given by the curve B in FIG. 6; and the substitution of the expression (20) for E2s in the expression (12), and the substitution of the expression (10) for E1t in the expression (20) will induce the foregoing expression (5).

Similarly, the take-in efficiency η32 is given by the curve A in FIG. 6; and the substitution of the expression (22) for NAu in the expression (14), and the substitution of the expression (21) for W in the expression (22) will induce the foregoing expression (4).

From the above expressions (4), (5), and (16), the expression (6) which gives the curve C in FIG. 6 can be acquired.

Next, the effective aperture D1 of the first convex lens 13 and the effective aperture D2 of the second convex lens 14 will be discussed as factors that influence the optical fiber connector.

1) For the Case of only the Effective Aperture D1 of the First Convex Lens 13 having Influence For the case that the effective aperture D1 of the first convex lens 13 is smaller than a specific size, the light emitted from the PCF 16S is restrained by the effective aperture D1 of the first convex lens 13, and the beam to the second convex lens 14 and the POF 18 is limited.

Therefore, since the connection efficiency η at the POF 18 is affected by η1 of the expression (8), it becomes the expression (16) multiplied by the expression (8), which is expressed as follows.

$$\eta = \eta 1 \times \eta 3 = \eta 1 \times \eta 31 \times \eta 32 \tag{25}$$

$$= (D1/E1s)^2 \times (E2/E2s)^2 \times NA2/NAu$$

$$= (D1/(E1+2 \times f \times \tan(\sin^{-1} NA1)))^2 \times$$

$$(1/x)^2 \cdot NA2/\sin(\tan^{-1} E1/E2 \cdot NA1/x)$$

2) For the Case of only the Effective Aperture D2 of the Second Convex Lens 14 having Influence For the case that the effective aperture D2 of the second convex lens 14 is smaller than a specific size, the light emitted from the first convex lens 13 is restrained by the effective aperture D2 of the second convex lens 14, and the beam to the POF 18 is limited.

Therefore, since the connection efficiency η is affected by η2 of the expression (11), it becomes the expression (16) multiplied by the expression (11), which is expressed as follows.

$$\eta = \eta 2 \times \eta 3 = \eta 2 \times \eta 31 \times \eta 32 \tag{26}$$

$$= (D1/E1t)^2 \times (E2/E2s)^2 \times NA2/NAu$$

$$= (D1/(D1 \times f2/f1))^2 \times$$

$$(1/x)^2 \cdot NA2/\sin(\tan^{-1} E1/E2 \cdot NA1/x)$$

$$= (f1/f2 \cdot 1/x)^2 \cdot NA2/\sin(\tan^{-1} E1/E2 \cdot NA1/x)$$

3) For the Case of both the Effective Apertures D1, D2 of the First and Second Convex Lenses 13, 14 having Influence For the case that the effective apertures D1, D2 of the first and second convex lenses 13, 14 are both smaller than a specific size, since the connection efficiency η is affected by these effective apertures D1, D2, it becomes the expression (16) multiplied by the expression (8) and the expression (11), which is expressed as follows.

$$\eta = \eta 1 \times \eta 2 \times \eta 3 = \eta 1 \times \eta 2 \times \eta 31 \times \eta 32 \tag{27}$$

$$= (D1/(E1+2 \times f \times \tan(\sin^{-1} NA1)))^2 \times$$

$$(f1/f2 \cdot 1/x)^2 \times NA2/\sin(\tan^{-1} E1/E2 \cdot NA1/x)$$

The following table 1 presents the contents explained above, in which the influence of only the numerical aperture NA and the influence of only the beam size correspond to a case of η31=1.0 and η32=1.0 in the expressions (25), (26), (27).

TABLE 1

|  | influence by NA | influence by NA & influence by beam size | influence by beam size |
|---|---|---|---|
| influence by D1: null influence by D2: null (D1, D2:∞) | $\eta 32$ | $\eta 31 \times \eta 32$ | $\eta 31$ |
| influence by D1 | $\eta 1 \times \eta 32$ | $\eta 1 \times \eta 31 \times \eta 32$ | $\eta 1 \times \eta 31$ |
| influence by D2 | $\eta 2 \times \eta 32$ | $\eta 2 \times \eta 31 \times \eta 32$ | $\eta 2 \times \eta 31$ |
| influence by D1 influence by D2 | $\eta 1 \times \eta 2 \times \eta 32$ | $\eta 1 \times \eta 2 \times \eta 31 \times \eta 32$ | $\eta 1 \times \eta 2 \times \eta 31$ |

Next, a concrete example of this type of optical fiber connector 10 will now be explained.

As shown in Table 2, the model A is made up with the following data: the core diameter E1 of the POF 16S being 1 mm, the numerical aperture NA1 of the POF 16S being 0.15, the effective aperture D1 of the first convex lens 13 being sufficiently large, the focal length f1 being 5 mm, the effective aperture D2 of the second convex lens 14 being sufficiently large, the focal length f2 being 1 mm, the core diameter E2 of the PCF 18 being 0.2 mm, and the numerical aperture NA2 of the PCF 18 being 0.33. These data induce x=1, which implies the maximum efficiency $\eta a$ shown in FIG. 6. Substituting x=1 and the relevant data from the above for the expression (6), $\eta a$=0.55 is acquired, and the loss $\eta$LOS in this fiber connection can be expressed as follows.

$$\eta LOS = -10 \cdot \log (\eta a(=0.55)) \approx 2.6 \text{ dB}$$

TABLE 2

| Model A | | | | | | |
|---|---|---|---|---|---|---|
| core diameter E1 | numerical aperture NA1 | core diameter E2 | numerical aperture NA2 | x | focal length f1 | focal length f2 |
| 1 mm | 0.15 | 0.2 mm | 0.33 | 1 | 5 mm | 1 mm |

Next, as shown in table 3, the model B is made up with the following data: the core diameter E1 of the POF 16S being 0.75 mm, the numerical aperture NA1 of the POF 16S being 0.2, the effective aperture D1 of the first convex lens 13 being sufficiently large, the focal length f1 being 3.75 mm, the effective aperture D2 of the second convex lens 14 being sufficiently large, the focal length f2 being 1 mm, the core diameter E2 of the PCF 18 being 0.2 mm, and the numerical aperture NA2 of the PCF 18 being 0.33. From the same calculation as the model A, the loss $\eta$LOS=2.6 dB is acquired.

Therefore, the connection efficiency $\eta$ of the fibers is satisfied with a desirable value of approximately 0.5 (50%).

TABLE 3

| Model B | | | | | | |
|---|---|---|---|---|---|---|
| core diameter E1 | numerical aperture NA1 | core diameter E2 | numerical aperture NA2 | x | focal length f1 | focal length f2 |
| 0.75 mm | 0.2 | 0.2 mm | 0.33 | 1 | 3.75 mm | 1 mm |

Thus, the optical fiber connector 10 of the invention has been described by using the model cases. And here, the POF 16 is an integration of the POF 16S and the convex lens 16, as shown in FIG. 1, which is equivalent to one formed by polishing the front end of the POF 16S into a convex lens-shape. This convex part 16c being the front end of the POF 16 will be explained on the basis of FIG. 16.

Figure 16:
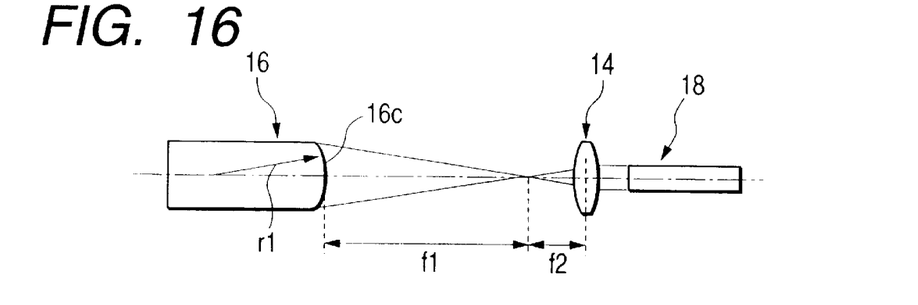
FIG. 16 is a drawing to explain an optical fiber with a radius of curvature in the optical fiber connector of the invention.

In the POF 16, provided that the radius of curvature of the convex part 16c of the core 16a is, given by r1, and the refractive index of the core 16a is given by n1, the relation by the following expression is deduced.

$$\text{Focal length: } f1 = r1/(n1-1) \tag{28}$$

Therefore, by substituting the expression (28) for the expression (2), the POF 16 can be applied to the optical fiber connector 10 shown in FIG. 16 as it is.

Next, concrete examples as this type of the optical fiber connector 10 will be discussed. As shown in Table 4, the model C is constructed having the following data: the core diameter E1 of the POF 16 being 1 mm, the numerical aperture NA1 of the POF 16 being 0.15, the refractive index n1 being 1.5, the lens-shaped radius r1 of the front end of the core 16a being 2.5 mm, the core diameter E2 of the PCF 18 being 0.2 mm, and the numerical aperture NA2 of the PCF 18 being 0.33. Thereby, without using the first convex lens 13, the model C will be the same optical fiber connector as the model A.

Further, the model D is constructed having the following data: the core diameter E1 of the POF 16 being 0.75 mm, the numerical aperture NA1 of the POF 16 being 0.2, the refractive index n1 being 1.5, the lens-shaped radius r1 of the front end of the core 16a being 1.875 mm, the core diameter E2 of the PCF 18 being 0.2 mm, and the numerical aperture NA2 of the PCF 18 being 0.33. Thereby, without using the first convex lens 13, the model D will be the same optical fiber' connector as the model B.

Thus, in the optical fiber connector, the connection of a plastic optical fiber (POF 16) and a fused quartz fiber (PCF 18) has been described, however it is not limited to this combination.

For example, it may be a combination of two plastic fibers each having different diameters. In this case, without using lenses, it is only needed to use the plastic fibers by polishing both the front ends thereof into spherical shaped-lenses.

For example, by setting the radius of curvature r2 of the plastic fiber core on the light receiving side to 0.5 mm and setting the focal length f2 to 1 mm, an optical fiber connector with a high efficiency of the optical connection will be achieved without using the first and the second convex lenses 13, 14.

TABLE 4

| | POF | | | | |
|---|---|---|---|---|---|
| | core diameter E1 | numerical aperture NA1 | refractive index n1 | focal length f1 | radius of curvature r1 |
| model C | 1 | 0.15 | 1.5 | 5 | 2.5 |
| model D | 0.75 mm | 0.2 | 1.5 | 3.75 mm | 1.875 mm |

| | 2nd convex lens | PCF | | | |
|---|---|---|---|---|---|
| | focal length f2 | core diameter E2 | numerical aperture NA2 | focal length f2 | radius of curvature r2 |
| model C | 1 | 0.2 | 0.33 | 1 | 0.5 |
| model D | 1 mm | 0.2 mm | 0.33 | 1 mm | 0.5 mm |

As described above, the optical fiber connector of this invention exhibits a high connection efficiency of the fibers in the region shown by the slant lines in FIG. 6. Therefore, to set the values of the factors that enter the region will achieve the apparatus of a predetermined connection efficiency.

As described above, the optical fiber connector of the invention includes a first optical fiber, a first lens that converges light emitted from the first optical fiber, a second lens that converges light emitted from the first lens, and a second optical fiber that receives convergent light from the second lens. In the optical fiber connector thus configured, provided that the ore diameter of the first optical fiber is given by E1, the numerical aperture thereof by NA1, the core diameter of the second optical fiber by E2, the numerical aperture thereof by NA2, the focal length of the first lens by f1, and the focal length of the second lens by f2, and $(E1/E2)/(f1/f2)=x$ is introduced, the connection efficiency $\eta$ of the first and the second optical fibers satisfies the following inequality:

$$(E1/E2)^2 < \eta \leq NA2/\sin(\tan^{-1} E1/E2 \cdot NA1/x),$$

in $$0 < x \leq 1;$$

$$(E1/E2)^2 < \eta \leq (1/x)^2 \cdot NA2/\sin(\tan^{-1} E1/E2 \cdot NA1/x),$$

in $$-1 < x < E1/E2 \cdot NA1/\sin(\tan)^{-1} NA2)$$

or $$(E1/E2)^2 < \eta \leq (1/x)^2,$$

in $$E1/E2 \cdot NA1/\sin(\tan^{-1} NA2) \leq x$$

From the relation given by the above inequity, The optical fiber connector of the invention can significantly enhance the connection efficiency compared with the direct connection of the fist and second optical fibers, and can transmit light between remotely located places under an optimized condition, since it is designed to make the diameter of the first optical fiber differ from the diameter of the second optical fiber, and to adjust either one of the numerical apertures and the beam sizes of the fist and second optical fibers, or variable factors of the numerical apertures and the beam sizes.

Further, provided that the effective aperture of the first lens is given by D1, the effective aperture of the second lens is given by D2, the connection efficiency $\eta 1$ is influenced by only D1 and is expressed by the equation:

$$\eta 1 = D1/(E1 + 2 \times f1 \times \tan(\sin^{-1} NA1))^2,$$

and the connection efficiency $\eta 2$ is influenced by only D2 and is expressed by the equation:

$$\eta 2 = (D1/(D1 \times f2/f1))^2,$$

the connection efficiency is the foregoing $\eta$ multiplied by $\eta 1$ and/or $\eta 2$.

Thereby, the invention can achieve a connection efficiency between the divergent light and the convergent light by taking into consideration either one or both of the effective apertures of the first and second lenses.

Further, the first lens is made by forming the end face of the first optical fiber into a spherical face, and the second lens is made by forming the end face of the second optical fiber into a spherical face. Thereby, the invention can form an optical fiber connector without a separately provided lens member, reducing the number of the components, and increasing the connection efficiency of the optical fibers, since alignment of the lenses is not needed.

Further, either one of the first and the second lenses is made by forming the end face of the first or the second optical fiber into a spherical face.

Thereby, the invention can form an optical fiber connector with a reduced number of lens members, thus reducing the number of the components, and allowing assembly with a high accuracy, since the alignment work of the lenses is reduced, and increasing the connection efficiency of the optical fibers.

What is claimed is:

1. An optical fiber connector comprising a first optical fiber, a first lens that converges light emitted from the first optical fiber, a second lens that converges light emitted from the first lens, and a second optical fiber that receives a convergent light beam from tine second lens, wherein, when a core diameter of the first optical fiber is given by E1, a numerical aperture thereof by NA1, a core diameter of the second optical fiber by E2, a numerical aperture thereof by NA2, a focal length of the first lens by f1, a focal length of the second lens by f2, and $(E1/E2)/(f1/f2)=x$ is given, a connection efficiency $\eta$ of the first and the second optical fibers satisfies the following inequalities:

$$(E1/E2)^2 < \eta \leq NA2/\sin(\tan^{-1}E1/E2 \cdot NA1/x),$$

for $$0 < x \leq 1;$$

$$(E1/E2)^2 < \eta \leq (1/x)^2 \cdot NA2/\sin(\tan^{-1}E1/E2 \cdot NA1/x),$$

for $$1 < x \leq E1/E2 \cdot NA1/\sin(\tan^{-1}NA2);$$

or $$(E1/E2)^2 < \eta \leq (1/x)^2,$$

for $$E1/E2 \cdot NA1/\sin(\tan^{-1}NA2) \leq x.$$

2. An optical fiber connector according to claim 1, wherein, when an effective aperture of the first lens is given by D1 and an effective aperture of the second lens is given by D2, a connection efficiency 01 is influenced by only D1 and is expressed by the equation:

$$\eta 1 = D1/(E1 + 2 \times f1 \times \tan(\sin^{-1} NA1))^2,$$

and a connection efficiency 02 is influenced by only D2 and is expressed by the equation:

$$\eta 2 = (D1/(D1 \times f2/f1))^2,$$

the connection efficiency is the η multiplied by η1 and/or η2.

3. An optical fiber connector according to claim 1, wherein the first lens is made by forming an end face of the first optical fiber into a spherical face, and the second lens is made by forming an end face of the second optical fiber into a spherical face.

4. An optical fiber connector according to claim 1, wherein only one of the first and the second lenses is made by forming an end face of the eslective optical fiber into a spherical face.

5. An optical fiber connector according to claim 2, wherein the first lens is made by forming an end face of the first optical fiber into a spherical face, and the second lens is made by forming an end face of the second optical fiber into a spherical face.

6. An optical fiber connector according to claim 2 wherein only one of the first and the second lenses is made by forming an end face of the respective optical fiber into a spherical face.

* * * * *